(12) United States Patent
Miyazaki (10) Patent No.: US 6,707,525 B2
(45) Date of Patent: Mar. 16, 2004

(54) LIQUID CRYSTAL DISPLAY DEVICE (75) Inventor: Tatsuya Miyazaki, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 10/226,268

(22) Filed: Aug. 23, 2002

(65) Prior Publication Data
US 2003/0043333 A1 Mar. 6, 2003

(30) Foreign Application Priority Data
Aug. 28, 2001 (JP) ........................................ 2001-257165

(51) Int. Cl.$^7$ ............................................. G02F 1/1339
(52) U.S. Cl. ........................................ 349/157; 349/155
(58) Field of Search ................................ 349/155–157

(56) References Cited

U.S. PATENT DOCUMENTS 5,566,013 A * 10/1996 Suzuki et al. ............... 349/155

2002/0021386 A1 * 2/2002 Yotsuya et al. ............... 349/95

FOREIGN PATENT DOCUMENTS

| JP | 9-127515 | 5/1997 |
| JP | 9-211469 | 8/1997 |

* cited by examiner

Primary Examiner—Dung Nguyen
(74) Attorney, Agent, or Firm—Young & Thompson

(57) ABSTRACT

In a liquid crystal display device in which a liquid crystal layer is sandwiched between a TFT array substrate and a color filter array substrate disposed opposite each other through a group of spacer particles, the group of spacer particles are constructed such that the spacer particles having a standard deviation of particle size distribution of not greater than 3% of average particle size are produced by a seed polymerization method and classified into groups of particles to exclude abnormal group of particles from the spacer particles.

6 Claims, 5 Drawing Sheets

LIQUID CRYSTAL DISPLAY DEVICE

BACKGROUND OF THE INVENTION

1. Field of the Invention

The present invention relates to a liquid crystal display device, and more particularly to a liquid crystal display device used as a display screen of a portable personal computer or the like.

2. Description of the Related Art

Conventionally, a color liquid crystal display (LCD) panel has been known as a display device of a portable personal computer or the like.

The color LCD panel is manufactured by, for example, sandwiching a liquid crystal between a TFT (thin film transistor) array substrate and a color filter array substrate. A color LCD module produced by attaching peripheral members such as a driver LSI and a light unit to the panel for modularization is integrated within a main body cover of the portable personal computer and thereby used as a display screen.

The portable personal computer in which the color LCD panel is mounted can be freely carried and used because of its portability. Thus, even when a vibration is imparted to the computer during carriage of the computer or the like, the panel is required to maintain its display quality. Accordingly, a vibration is imparted to the color LCD panel as a quality test to secure the reliability of LCD panel before shipment.

Figure 1A:
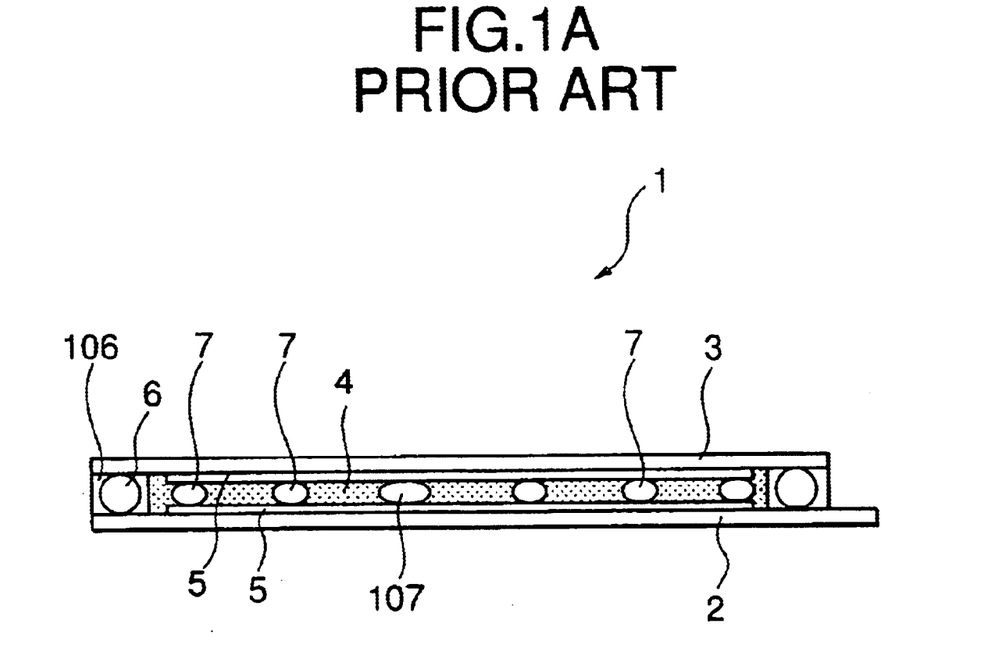
FIG. 1A is a sectional view thereof.
Figure 1B:
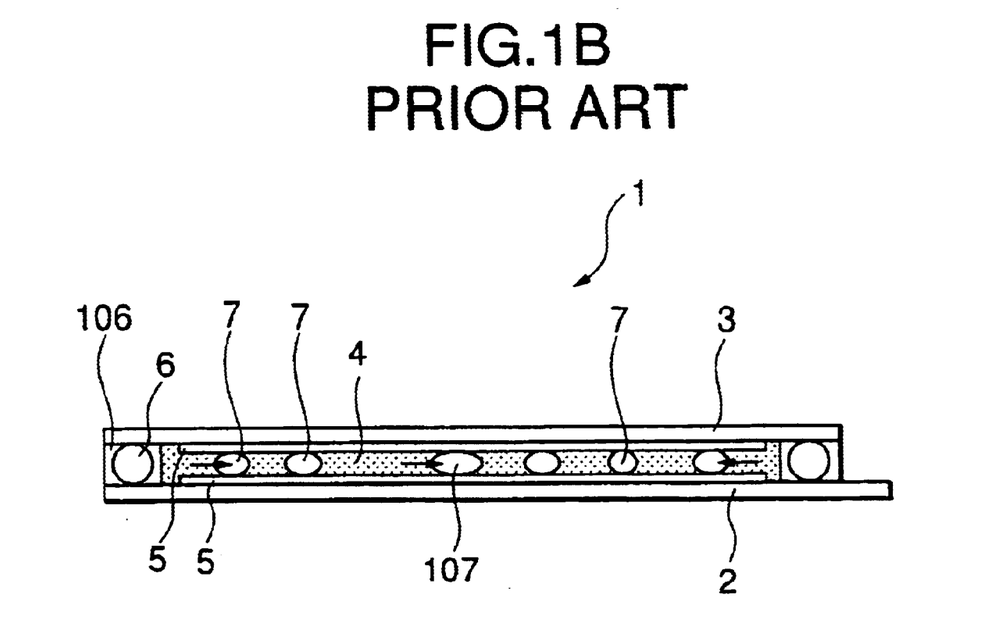
FIG. 1B is a sectional view for explaining an abnormal alignment.

FIGS. 1A and 1B show the configuration of a conventional color LCD panel and FIG. 1A is a sectional view thereof, and FIG. 1B is a sectional view thereof for explaining an abnormal alignment. As shown in FIG. 1A, the conventional color LCD panel 1 includes: a TFT array substrate 2; a color filter array substrate 3; and a liquid crystal layer 4 sandwiched between both the substrates 2 and 3.

Alignment films 5 are respectively formed on surfaces of the TFT array substrate 2 and the color filter array substrate 3, the surfaces being disposed opposite each other. The liquid crystal layer 4 surrounded by a sealant 106 that covers a sealing spacer 6 is formed between the TFT array substrate 2 and the color filter array substrate 3. A gap formed between both substrates 2 and 3 (cell gap) and representing a thickness of the liquid crystal layer 4 is adjusted by a plurality of spacers 7 located therebetween.

The spacers 7 consist of particles having a spherical shape, a columnar shape or the like. Generally, a LCD panel employs spherical shaped particles having diameters characterized by a standard deviation of 3% to 5% of average particle size. Thus, a pressure applied to the spacers varies depending on different diameters of the respective spacers 7 while causing a variation in an amount of deformation of the respective spacers 7.

In other words, after completion of assembly of cell, the spacers 7 are in a compressed state and the spacer 7 having a small diameter is rarely deformed, and the spacer 107 having a large diameter is deformed to a large extent (FIG. 1B).

In this state, when a vibration is imparted to the color LCD panel 1, the small spacer 7 moves within the panel (see arrows in FIG. 1B). Even when the spacer 7 having an average diameter and deformed to a small extent moves, it moves causing small friction with the alignment films and therefore, never causes change of alignment in the alignment films.

However, particularly in the case where the spacer 107 having a large diameter moves within a large panel, imparting large pressure to the TFT array substrate 2 and the color filter array substrate 3 deforms the panel to thereby move the spacers. Thus, the friction between the moved spacers and the surfaces of both substrates 2 and 3 damages the alignment films 5.

As a result, the alignment films 5 is again aligned along the direction in which the spacer moves, thereby producing a bright point as a lighting point on a display screen. The bright point occurs more easily in proportion to the size of a screen. It would appear that in proportion to the size of a screen, the deformation of the panel is enhanced to partially impart large force to the panel. Hereinafter, the bright point thus generated is called a vibration bright point.

Figure 2:
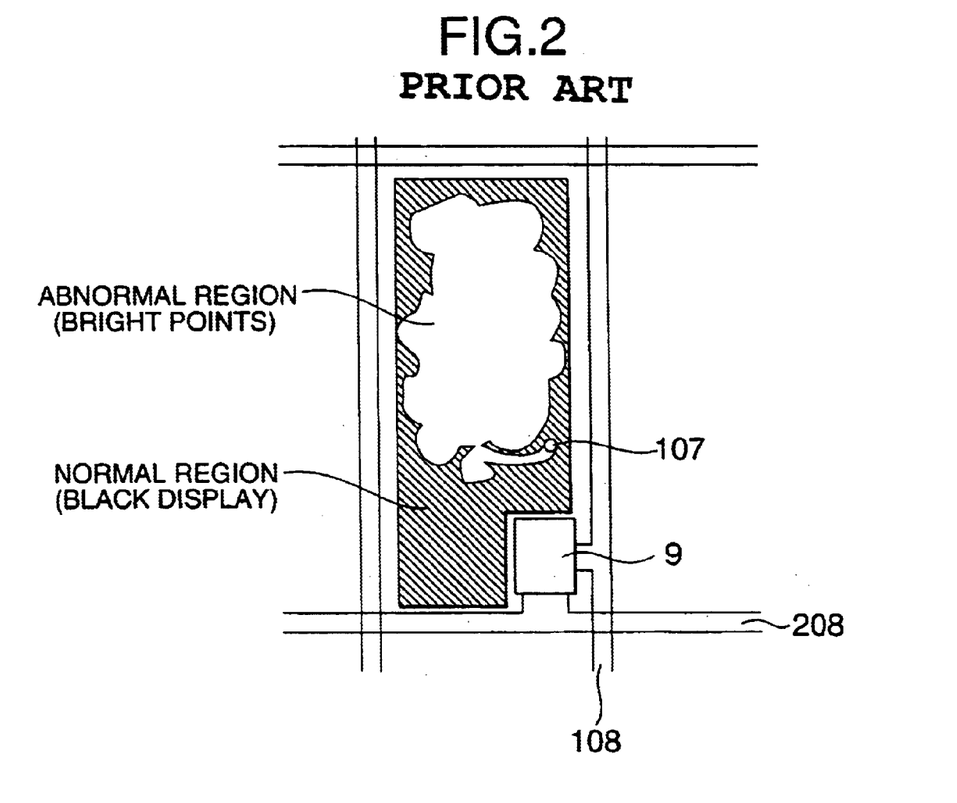
FIG. 2 is an explanatory view showing a bright point produced by the abnormal alignment in the color LCD panel as shown in FIGS. 1A and 1B.

FIG. 2 is an explanatory view showing a bright point produced by the abnormal alignment observed in the color LCD panel shown in FIG. 1B. As shown in FIG. 2, a pixel is defined by drain wirings 108 and gate wirings 208 and driven by a TFT 9. When the spacer 107 having a large particle size moves within such a pixel to cause an abnormal alignment that changes the alignment of the alignment films 5, a region to be displayed normally becomes an abnormal region corresponding to a bright point.

Thus, when the abnormal region corresponding to the bright point is visually recognized on an image, a display contrast of the image is lowered (see JP 09-127515 A).

In order to prevent a vibration bright point from occurrence in a vibration test that is conducted before shipment of an LCD panel, it is necessary to make a particle size distribution of particles within a predetermined range of values so as not to include a spacer having a large particle size.

With respect to the particle size distribution of particles, in a period during which the size of a screen of portable personal computer or the like has been small as observed when a conventional portable personal computer was prevalently used, an LCD panel is also small in size and deformation of the LCD panel due to vibration itself is small, whereby a bright point rarely occurs. Even when a standard deviation of a particle size distribution of particles is of 3% to 5% of average particle size, vibration imparted to the LCD panel is suppressed small.

Recently, the portable personal computer having a large screen size (for example, 14.1-inch type in a notebook personal computer) has been prevalently used making the size of an LCD panel enlarged and therefore, a particle size distribution of particles observed in the conventional LCD panel becomes impermissible in terms of prevention of failure due to occurrence of bright point, thereby causing necessity of making a particle size distribution of particles not greater than 3% of average particle size.

In other words, since the LCD panel enlarged in size has a structure in which an interval between points to support the panel increases, the LCD panel is deformed to a larger extent when external force is imparted thereto, so that the LCD panel partially receives large force (not less than 10 times the external force in some cases).

Such a phenomenon largely affects a LCD panel when the panel is assembled by a front mounting method as one of assembly methods for an LCD panel. That is, when using the front mounting method, as compared with other mounting methods, an interval between points to support the panel is large and the panel itself is not secured to a case by screws, increasing the allowance between the case and the LCD panel. Accordingly, when force is locally imparted to the panel, the spacers within the LCD panel are forcibly moved, causing a bright point due to the realignment of alignment films.

Also, up to now, although a generally used resin spacer has been formed by a suspension polymerization method (the method is widely used in a polymer synthesis technique, in which a liquid organic solvent is dropped into a solvent such as water and after the organic solvent becomes a colloid state as milk, the resultant solvent is heated to obtain particles having the same size as that of the organic solvent during operation for dropping the organic solvent. The drawbacks of the method are that a variation in an amount of organic solvent becomes large during operation for dropping the organic solvent, so that the variation in sizes of the obtained particles becomes large), when a spacer is formed by the suspension polymerization method, a size distribution of particles becomes widely spread and therefore, an operation for classifying particles into some groups of particles based on a target particle size has been necessary. (The classifying operation is performed as follows: mix a powder into a solvent (such as water or an organic solvent, which does not allow the powder to dissolve therein); and stir the solvent; and then, leave the solvent as it is to obtain only particles having a target particle size while removing particles having a size different from the target particle size, in which operation large sized particles are precipitated in a relatively short time and small sized particles are precipitated in a relatively long time.)

To complete the operation for classifying particles, it takes about two weeks in the case where a standard deviation of a particle size distribution is 5% or less and about one month in the case where the standard deviation of the particle size distribution is 4% or less, and about two months in the case where the standard deviation of the particle size distribution is 3% or less, resulting in difficulty in making the standard deviation of the particle size distribution not greater than 3% in terms of prevention of time-consuming process and high manufacturing cost.

In contrast, a seed polymerization method of making a seed particle (microparticle as a nucleus in polymerization reaction) grow in a snowballing manner to produce a particle has recently been developed. The advantage of the method is that particles each having nearly the same particle size are advantageously extracted by controlling conditions (temperature, time, and the like). When employing the seed polymerization method, a variation in sizes of the extracted particles itself is very small (standard deviation σ= about 2.6% to 3%) and therefore, the occurrence of a bright point can be suppressed. However, when two seed particles are bonded to each other forming a particle having an abnormal size, the particles having such an abnormal particle size are inevitably and unfavorably contained in the extracted particles.

As described above, in order to address the enlargement of the LCD panel, it is necessary to make the standard deviation of the particle size distribution not greater than 3% of average particle size. However, it is substantially impossible and impractical to meet the above-mentioned requirement by using the operation for classifying particles. Also when employing the seed polymerization method in which a variation in particle sizes is very small (standard deviation σ= about 2.6% to 3%), since two seed particles are bonded to each other forming a particle having an abnormal size, the particles having such an abnormal particle size are inevitably and unfavorably contained in the extracted particles.

SUMMARY OF THE INVENTION

An object of the present invention is to provide a color liquid crystal display device in which a group of spacer particles are produced by a seed polymerization method so that spacers are made to have a standard deviation of particle size distribution of not greater than 3% of average particle size while excluding abnormal group of particles therefrom to prevent occurrence of vibration bright points at the time of vibration test even when the LCD panel is enlarged.

In order to attain the above-mentioned object, a liquid crystal display device of the present invention is constructed as follows. That is, the liquid crystal display device includes a liquid crystal layer, two substrates disposed opposite each other while sandwiching the liquid crystal layer therebetween, a group of spacer particles dispersed in the liquid crystal layer, in which the group of spacer particles have a standard deviation of particle size distribution of not greater than 3% of an average particle size and exclude particles having a particle size not less than 1.14 times the average particle size therefrom.

As described above, according to the present invention, in a liquid crystal display device in which a liquid crystal layer is sandwiched between two substrates disposed opposite each other through a plurality of spacers, the individual spacers is constructed such that spacer materials having a standard deviation of particle size distribution of not greater than 3% of average particle size are produced by a seed polymerization method and classified into groups of particles to exclude abnormal group of particles from the spacer materials. Accordingly, allowing spacers to have a standard deviation of particle size distribution of not greater than 3% of average particle size while excluding abnormal group of particles from the spacers makes it possible to prevent occurrence of vibration bright points at the time of vibration test even when the LCD panel is enlarged.

BRIEF DESCRIPTION OF THE DRAWINGS

In the accompanying drawings:

FIGS. 1A and 1B show the structures of a conventional color LCD panel, in which

FIGS. 4A to 4C are explanatory views of mounting methods for a color LCD module using the color LCD panel shown in FIG. 3, in which

DETAILED DESCRIPTION OF THE PREFERRED EMBODIMENTS

An embodiment of the present invention will be described with reference to the accompanying drawings.

Figure 3:
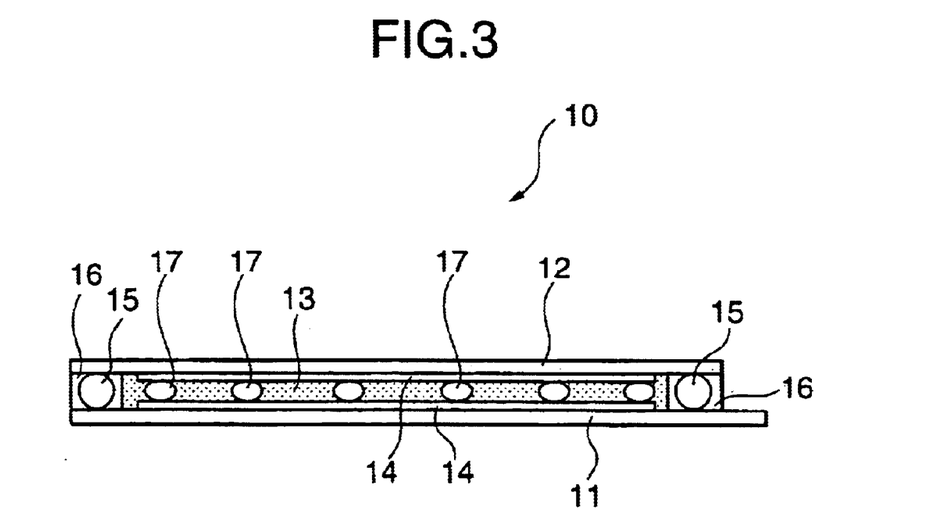
FIG. 3 is a sectional view showing the structure of a color LCD panel according to an embodiment of the present invention.

FIG. 3 is a sectional view showing a configuration of a color LCD panel constructed in accordance with an embodiment of the present invention. As shown in FIG. 3, a color LCD panel 10 is manufactured by sandwiching a liquid crystal layer 13 between a TFT array substrate 11 and a color filter (CF) array substrate 12.

A TFT as a semiconductor element for driving the liquid crystal layer 13 is formed to have a specific pattern on the TFT array substrate 11. Color filters are formed on the color filter array substrate 12 as a counter substrate located opposite the TFT array substrate 11 such that patterns each consisting of three primary colors, i. e., R (red), G (green) and B (blue) are arranged in accordance with a specific order.

Alignment films 14 are formed on respective surfaces of the TFT array substrate 11 and the color filter array substrate 12 on sides thereof opposite each other. The liquid crystal layer 13 surrounded by a sealant 16 covering a sealing spacer 15 is formed between the TFT array substrate 11 and the color filter array substrate 12, which is aligned with the TFT array substrate 11. A gap between both substrates 11 and 12 (cell gap), which corresponds to a thickness of the liquid crystal layer 13, is adjusted by a plurality of spacers 17 located therebetween.

The color LCD panel 10 is manufactured as follows: coat an alignment film using a printing method on respective surfaces of the TFT array substrate 11 and the color filter array substrate 12; and orientedly rub the alignment film; and then, bond the two substrates to each other; and further, sinter the sealant and inject a liquid crystal between the two substrates. Thus, the color LCD panel 10 including the liquid crystal layer 13 therein sandwiched between the TFT array substrate 11 and the color filter array substrate 12, which are aligned with each other to overlap each other, through the spacers 17 is manufactured.

A color LCD module fabricated by attaching peripheral members such as a driver LSI, a light source and terminals to the color LCD panel 10 is incorporated into, for example, a main housing of the portable personal computer and used as a color liquid crystal display device.

Figure 4A:
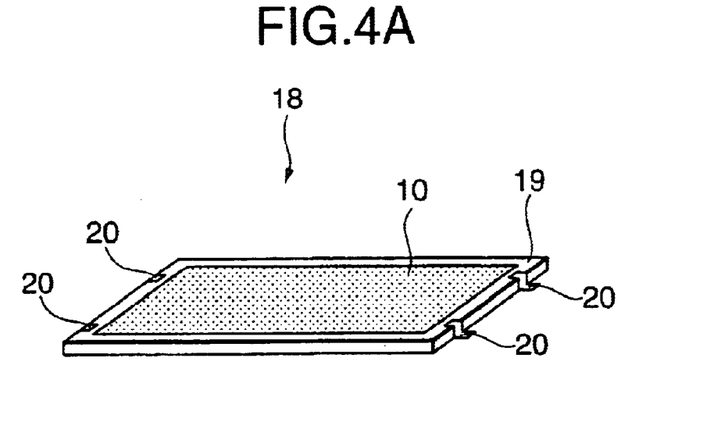
FIG. 4A is a perspective view for illustrating front mounting.
Figure 4B:
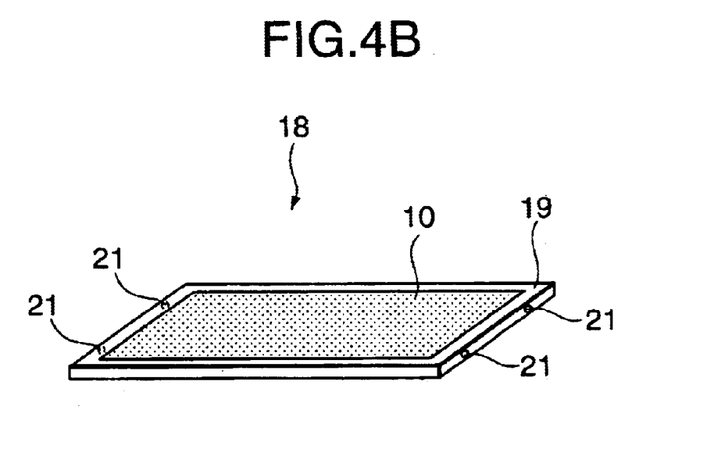
FIG. 4B is a perspective view for illustrating side mounting.
Figure 4C:
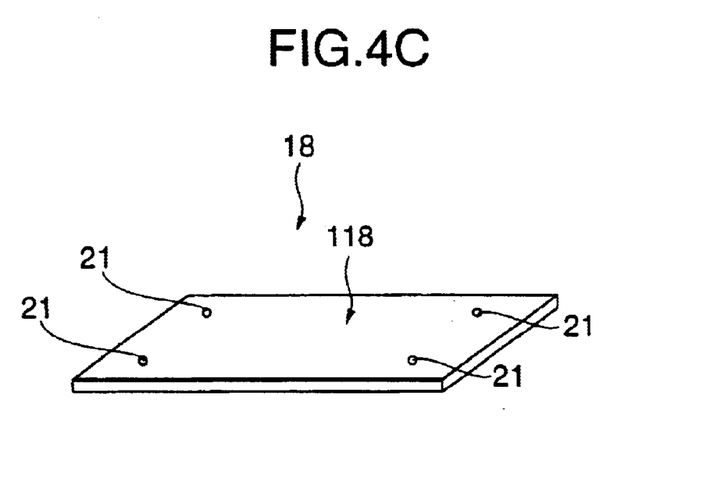
FIG. 4C is a perspective view for illustrating rear mounting.

FIGS. 4A to 4C are explanatory views illustrating a method for fabricating a color LCD module using the color LCD panel shown in FIG. 3 and FIGS. 4A, 4B, 4C respectively are perspective views illustrating a front mounting method, a side mounting method and a rear mounting method.

As shown in FIG. 4A, a color LCD module 18 has a frame structure (frame) 19 therein as a peripheral section of the module mounted to the color LCD panel 10.

The color LCD panel 10 is incorporated within the color LCD module 18 using the following mounting methods. That is, the front mounting method (see FIG. 4A) includes steps of pressing both short sides of the frame structure 19 from the front side thereof using claw shaped attachment members 20 to fix the color LCD panel to the frame structure. The side mounting method (see FIG. 4B) includes steps of fixing the color LCD panel with screws at screw cramping portions 21 located on both short sides of the frame structure 19 to the frame structure. The rear mounting method (see FIG. 4C) includes steps of fixing the color LCD panel with screws at screw cramping portions 21 located on the backside 118 of the frame structure 19 to the frame structure.

In a step of spraying spacers to form the above-mentioned color LCD panel 10, the spacers manufactured in the following manner are employed. That is, spherical spacers are manufactured to have a particle size distribution limited within a predetermined range of values such that particles having a particle size larger than that ranging within predetermined values never exist.

In more detail, in order to suppress occurrence of the vibration bright point, the spacers 17 are manufactured such that spacers having a diameter larger than a predetermined range of values are excluded from a group of particles having a standard deviation of particle size distribution not greater than 3% of average particle size.

Subjecting to the above-described operation, particles having an abnormal particle size can be excluded from a group of spacers containing spacers having a standard deviation of particle size distribution ranging from 2.6% to 3% of average particle size. This operation can be performed as observed when excluding dust mixed in the normal particles therefrom, which operation is performed in a relatively simple manner, and be carried out more simply and less time-consuming than that observed when directly excluding abnormal spacers from spacers having a broad particle size distribution.

In other words, since operation for excluding abnormal particles is performed with respect to particles having a standard deviation of particle size distribution ranging from 2.6% to 3% of average particle size, for example, operation for excluding abnormal particles performed using a suspension polymerization method with respect to particles having a standard deviation of particle size distribution exceeding 5% of average particle size may be employed in the present invention. In this case, it takes only one week or one to two days to perform the operation to exclude abnormal particles.

Note that JP 09-211469 A disclosing a theory of particle size and standard deviation never indicates the idea of the present invention. The technique disclosed by the publication is directed to provide a liquid crystal display device capable of stably maintaining quality of an image to be displayed while preventing deterioration in quality of an image to be displayed due to unnecessary spacers by using spacers having an asymmetric particle size distribution in which spacers have a diameter shorter than an average particle size and in addition, just tells that a standard deviation σ indicating a particle size distribution is preferably 3% to 6% of the average particle size. Furthermore, when mounting an LCD panel having a 14-inch screen size using a front mounting method in a conventional liquid crystal display device that utilizes such spacers, since spacers having a standard deviation of particle size distribution of 3% of average particle size indicate too large variations in particle size the LCD panel employing such spacers therein cannot have enough allowance to resist against external force which causes a bright point on a display screen at the time of vibration of panel.

In more detail, when abnormal particles having a standard deviation of particle size distribution over 3% of average particle size are mixed, the abnormal particles are flattened to a large extent and easily broken. Accordingly, when vibration is imparted to the color LCD panel 10, a large number of spacer materials are broken so that the broken spacer materials moves freely in a liquid cell. As a result, the broken spacer materials damage the alignment films 14 to disorder the alignment of the alignment films 14, thereby allowing a light to leak causing a bright point.

Figure 5:
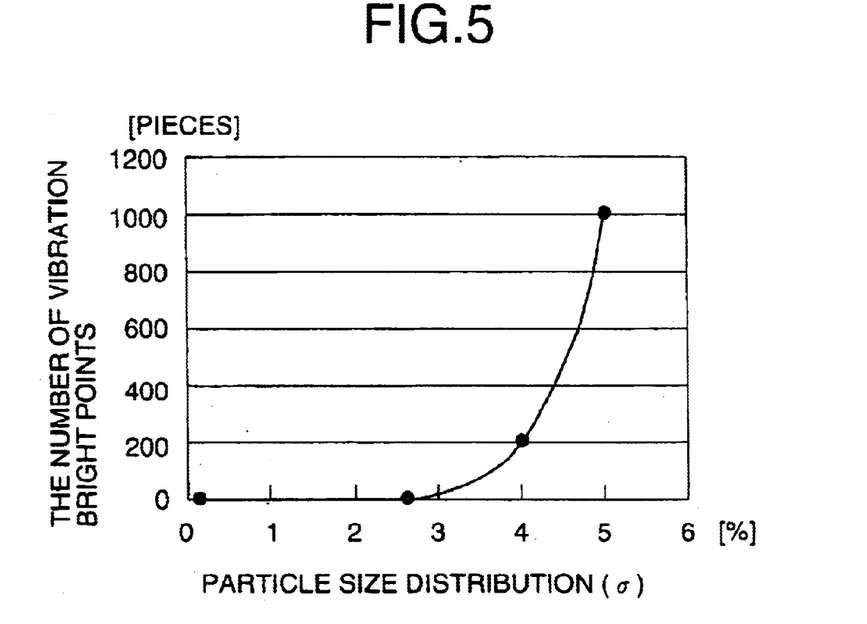
FIG. 5 is an explanatory graph showing a relationship between a particle size distribution and the number of vibration bright points.

FIG. 5 is an explanatory graph showing a relationship between a particle size distribution and the number of vibration bright points.

As shown in FIG. 5, when a standard deviation σ (%) of a particle size distribution is 0%, the number of vibration bright points is substantially 0. Subsequently, in accordance with increase in the value of the standard deviation, the number of vibration bright points varies as follows: it begins increasing around the value of over 2%; and becomes about 10 at 2.60%; and then, becomes about 23 at 3.00%; and further, becomes about 212 at 4.00%; and finally, becomes about 1000 at 5.00%.

The particle size is measured by a Coulter counter and the number of particles used in a sample is about 50000. In addition, an average particle size D and a standard deviation σ are obtained by the following equation based on a particle size Di in each sample and three decimal places are rounded off to use them as test values.

$$D = 3\sqrt{\{6(V1+V2+ \ldots +Vn)/\pi N\}},$$

where $Vi = \pi Di^3/6$ and N is the number of particles used in a sample.

$$\sigma = \sqrt{[\{(D-D1)+(D-D2)+ \ldots +(D-DN)\}/N]}$$

As a result, in the case where a liquid crystal panel includes particles having a standard deviation σ= 2.6%, particles having a particle size greater than that (1.08 times the average particle size) corresponding to a standard deviation 3σ (in case of σ=2.6%) or more is basically classified into an abnormal particle. Regardless of such classification, an experiment has been performed to confirm a practical maximum value of size of a particle to be included in particles, which value should be referred to make the number of bright points not greater than 10, and the practical maximum value of size of a particle was determined 1.14 times the average particle size. That is, it was concluded that a maximum particle size should range from 1.08 times to 1.14 times the average particle size. When imparting external force to a liquid crystal panel that employs spacer materials meeting the above-described range of values and excluding abnormal particles whose particle size is greater than 1.14 times the average particle size in a vibration test, the liquid crystal panel did not show bright points up to 2 G (applying force "G") imparted thereto.

Note that the graph showing a relationship between the particle size distribution and the number of vibration bright points indicates data obtained by using as samples two 14-type notebook color LCD panel mounted by a front mounting method. The vibration test employs the following instrumental conditions: shock: 2 G; frequency: 5 to 100 Hz; shock cycles: 120; shock direction: X-,Y-,Z-directions; sweep: one-minute repetition logarithmic sweep. The result obtained at this time tells that force G actually applied to the panel locally reaches 20 G.

The embodiment also defines hardness of the spacer material. When the spacer material is too hard, the material itself becomes brittle and therefore, is broken into pieces before it is flattened when forming a gap between substrates by bonding the substrates together using a sealant and sintering the sealant. In contrast to this, when the spacer material is too soft, flatness of spacer material becomes large and external force increases in proportion to increase in an area at which the spacer material and the substrates contact each other, thereby easily causing vibration bright points as friction force grows in response to movement of spacer material.

Figure 6:
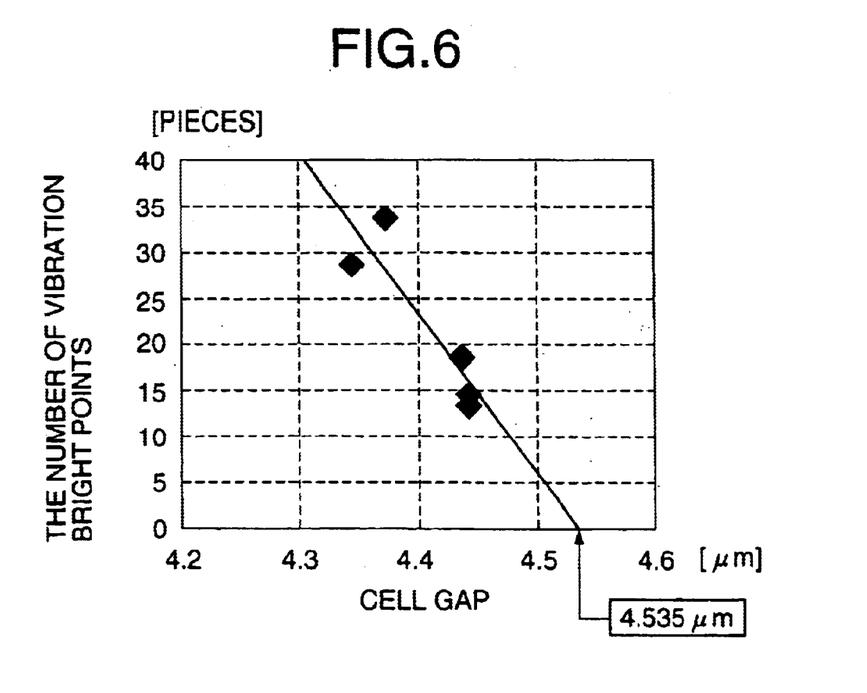
FIG. 6 is an explanatory graph showing a relationship between a cell gap and the number of vibration bright points.

FIG. 6 is an explanatory graph showing a relationship between a cell gap and the number of vibration bright points. FIG. 6, indicating an approximate line as a distribution of bright points, shows how the number of vibration bright points varies with respect to five values (i. e., five samples) of a cell gap (μm) between the TFT array substrate 11 and the color filter array substrate 12.

Accordingly, when using spacer materials having an average particle size of about 4.6 μm while excluding abnormal spacer materials having a large particle size, in order to prevent occurrence of the vibration bright point, the cell gap formed by the spacers 17 is preferably set at the value of 4.535 μm or more.

In more detail, when the cell gap is set at the value of 4.535 μm or more while the average particle size of the spacers 17 is set at the value of 4.6 μm and further, the cell gap is maintained to have the value of 4.535 μm, an amount of compression of the spacers 17 is calculated as follows.

When allowing abnormal particles having a particle size 1.08 to 1.14 times the average particle size to be included in normal particles, a maximum particle size of abnormal particle is calculated as 4.6×1.14=5.244 μm. Thus, the maximum amount of compression the spacers 17 show when external force is imparted thereto is calculated as (5.244−4.535)/5.244=0.135. That is, a spacer having a maximum particle size is reduced in size by about 14% of the maximum particle size.

Furthermore, since the cell gap is set at the value of 4.535 μm or more, deformation of the spacer 17 located between both substrates 11 and 12 is allowed down to the value calculated as 4.535/4.6=98.5%.

Therefore, it is concluded that occurrence of vibration bright points is made substantially zero by employing the following conditions: a gap between the TFT array substrate 11 and the color filter array substrate 12 (cell gap), which is determined by existence of the spacers 17, is set at the value of 98% to 100% of the average particle size of the spacer material; or the amount of compression of the spacers 17 is set at the value of not greater than 14% of a maximum particle size before compression of particles by adjusting pressure imparted to the substrates at the time of formation of gap such as a step for bonding the substrates or sintering the sealant.

The spacer material is shaped like a particle and to prevent particles from merging with each other, individual particles are made to have the same charge when sprayed from a spraying nozzle in an enclosed chamber in a spacer spraying step. Therefore, the particles are repelled one another at the instant when sprayed from the nozzle and then drop, preventing particles from merging with each other.

Figure 7:
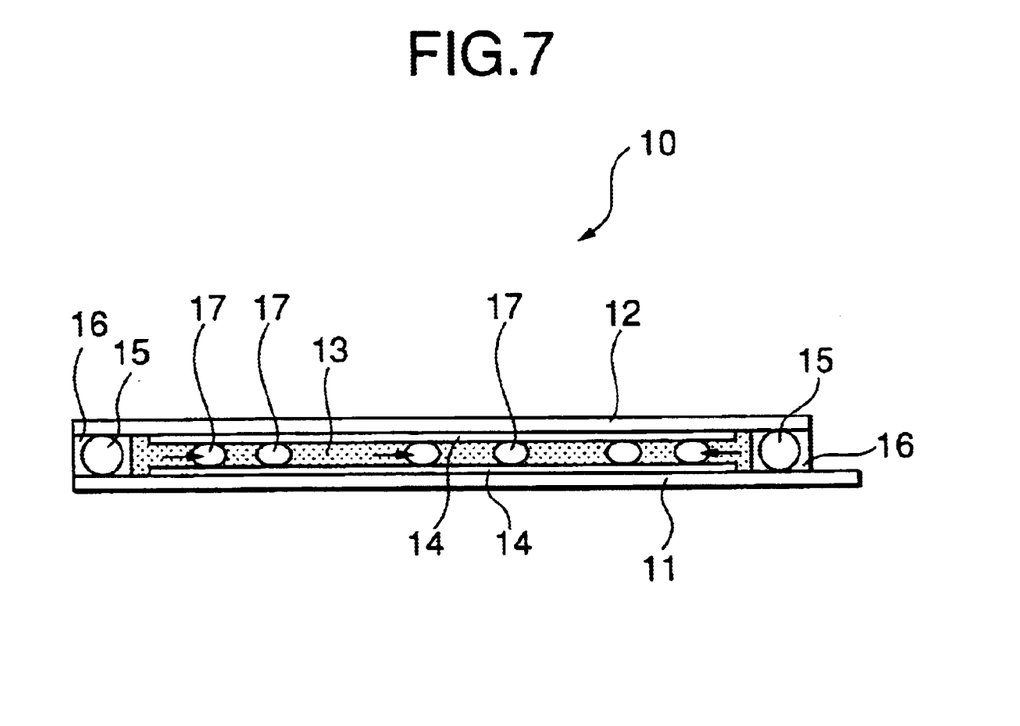
FIG. 7 is a sectional view for explaining operation of spacers when the color LCD panel shown in FIG. 3 is vibrated.

FIG. 7 is a sectional view for explaining movement of spacers when the color LCD panel shown in FIG. 3, 7 vibrates. As shown in FIG. 7, when the color LCD panel 10 is vibrated after completion of assembly of liquid crystal cell, the spacers 17 move within the color LCD panel 10 (see arrows in the drawing) and all the spacers 17 uniformly deformed by compression make cell gap substantially uniform.

In more detail, in the color LCD panel 10 after completion of assembly of the cell, the spacers 17 interposed between the TFT array substrate 11 and the color filter array substrate 12, which are aligned to overlap each other, are in a state in which they are uniformly deformed by compression (see FIG. 3). The state continues even when the color LCD panel 10 is vibrated.

For this reason, when the color LCD panel 10 vibrates, the alignment of the alignment films 14 never changes in response to movement of specific spacers 17 having a large particle size and deformed to a large extent.

When the color LCD module 18 is fabricated, the color LCD panel 10 is fixed by various mounting methods such as side mounting, rear mounting and front mounting, and the present invention can most effectively be applied to the front mounting among those methods. In addition, under a current environment where the size of screen has been growing, even a large size screen easily having vibration bright points generated therein is substantially free from failure due to occurrence of vibration bright points.

As described above, even the enlarged LCD panel fabricated in accordance with the present invention is made free from occurrence of vibration bright points at a vibration test for the following reason. That is, the individual spacers 17 included in the color LCD panel 10 are constructed such that spacer materials having a standard deviation of particle size distribution of 2.6% to 3% of average particle size are produced by a seed polymerization method and classified into groups of particles to exclude abnormal group of particles from the spacer materials, thereby providing normal group of particles to be used in the color LCD panel.

In addition, when fabricating the color LCD panel 10, in many cases, the spacers 17 are compressed by pressure imparted to the panel in steps of injecting a liquid crystal and sealing a sealant and therefore, the pressure is adjusted such that the amount of compression of the spacers 17 never exceeds about 14% of a particle size before compression. In more detail, securely maintaining the cell gap of about 4.535 $\mu$m or more in relation to the spacers 17 having the average particle size of about 4.6 $\mu$m makes the enlarged LCD panel free from occurrence of vibration bright points at the time of vibration test.

This is because the spacers are made to exclude specific abnormal particles having a large particle size and deformed when external force such as vibration is imparted thereto, whereby the specific abnormal particles are prevented from affecting the alignment film 14 when a vibration test is performed with respect to the color LCD panel 10.

It should be noted that in the above-described embodiment, the LCD panel is not limited to an example employing a color LCD panel and the liquid crystal display device also is not limited to an example employing a color LCD panel.

As described above, according to the present invention, in a liquid crystal display device in which a liquid crystal layer is sandwiched between two substrates disposed opposite each other through a plurality of spacers, the individual spacers are constructed such that spacer materials having a standard deviation of particle size distribution of not greater than 3% of average particle size are produced by a seed polymerization method and classified into groups of particles to exclude abnormal group of particles from the spacer materials. Accordingly, allowing spacers to have a standard deviation of particle size distribution of not greater than 3% of average particle size while excluding abnormal group of particles from the spacers makes it possible to prevent occurrence of vibration bright points at the time of vibration test even when the LCD panel is enlarged.

What is claimed is:

1. A liquid crystal display device comprising:

a liquid crystal layer;

two substrates disposed opposite each other while sandwiching said liquid crystal layer therebetween; and a group of spacer particles dispersed in said liquid crystal layer, said group of spacer particles having a standard deviation of particle size distribution of not greater than 3% of an average particle size and excluding particles having a particle size not less than 1.14 times said average particle size therefrom.

2. The liquid crystal display device according to claim 1, wherein said group of spacer particles are produced by a seed polymerization method.

3. The liquid crystal display device according to claim 1, wherein an amount of compression of said group of spacer particles is not greater than 14% of a maximum particle size observed before compression of said group of spacer particles.

4. The liquid crystal display device according to claim 1, wherein a gap generated by said group of spacer particles between said two substrates corresponds to values ranging from 98% to 100% of said average particle size of said group of spacer particles.

5. The liquid crystal display device according to claim 1, wherein one of said two substrates is a color filter array substrate having a color filter thereon.

6. The liquid crystal display device according to claim 1, wherein a liquid crystal display panel is modularized by mounting peripheral members thereto and fixed to a fixed member by a front mounting method.

* * * * *